United States Patent
Hegemann et al.

(10) Patent No.: US 9,829,575 B2
(45) Date of Patent: Nov. 28, 2017

(54) METHOD FOR REPRESENTING A VEHICLE ENVIRONMENT WITH POSITION POINTS

(71) Applicants: Conti Temic microelectronic GmbH, Nuremberg (DE); Continental Teves AG & Co. oHG, Frankfurt (DE)

(72) Inventors: Stefan Hegemann, Wangen (DE); Ralph Grewe, Lindau (DE); Andree Hohm, Obernburg (DE); Stefan Lueke, Bad Homburg (DE)

(73) Assignees: Conti Temic microelectronic GmbH, Nuernberg (DE); Continental Teves AG & Co. oHG, Frankfurt (DE)

( * ) Notice: Subject to any disclaimer, the term of this patent is extended or adjusted under 35 U.S.C. 154(b) by 428 days.

(21) Appl. No.: 14/381,734

(22) PCT Filed: Jun. 27, 2013

(86) PCT No.: PCT/DE2013/200025
§ 371 (c)(1),
(2) Date: Aug. 28, 2014

(87) PCT Pub. No.: WO2014/019574
PCT Pub. Date: Feb. 6, 2014

(65) Prior Publication Data
US 2015/0022392 A1    Jan. 22, 2015

(30) Foreign Application Priority Data
Jul. 30, 2012    (DE) .................. 10 2012 106 932

(51) Int. Cl.
*G01S 13/02*        (2006.01)
*G01S 7/00*         (2006.01)
(Continued)

(52) U.S. Cl.
CPC .............. *G01S 13/02* (2013.01); *G01S 7/003* (2013.01); *G01S 13/06* (2013.01); *G01S 13/931* (2013.01); *G01S 2013/9357* (2013.01)

(58) Field of Classification Search
CPC ........ G01S 13/02; G01S 13/06; G01S 13/931; G01S 2013/9357; G01S 7/003
(Continued)

(56) References Cited

U.S. PATENT DOCUMENTS 5,991,427 A    11/1999    Kakinami et al.
6,014,601 A    1/2000     Gustafson
(Continued)

FOREIGN PATENT DOCUMENTS

DE    197 38 764    3/1999
DE    101 33 945    2/2003
(Continued)

OTHER PUBLICATIONS

International Search Report of the International Searching Authority for International Application PCT/DE2013/200025, dated Oct. 9, 2 pages, European Patent Office, HV Rijswijk, Netherlands.
(Continued)

*Primary Examiner* — Timothy A Brainard
(74) *Attorney, Agent, or Firm* — W. F. Fasse

(57) ABSTRACT

A sensor system detects objects in an environment ahead of a vehicle. The environment is represented by a predetermined fixed number of position points in an environment model. Initially and when no objects are detected, the position points may be distributed stochastically over the detection area of the sensor system. When objects are detected, the position points are re-distributed based on the detected objects, e.g. with a higher density of position points to represent the detected objects. Because the total number of position points is a predefined fixed number that remains
(Continued)

constant, the processing, storage and transmission of the environment model involves a constant data volume and efficient use of memory and transmission bandwidth.

20 Claims, 3 Drawing Sheets

(51) Int. Cl.
*G01S 13/93* (2006.01)
*G01S 13/06* (2006.01)

(58) Field of Classification Search
USPC .................................................. 342/146, 385
See application file for complete search history.

(56) References Cited

U.S. PATENT DOCUMENTS

| | | | |
|---|---|---|---|
| 6,269,308 | B1 | 7/2001 | Kodaka et al. |
| 6,433,679 | B1 | 8/2002 | Schmid |
| 6,466,516 | B1* | 10/2002 | O'Brien, Jr. ............ G06F 17/18 367/131 |
| 6,498,972 | B1 | 12/2002 | Rao et al. |
| 7,138,909 | B2 | 11/2006 | Winner |
| 7,340,380 | B2 | 3/2008 | Klotz et al. |
| 7,382,236 | B2 | 6/2008 | Maass et al. |
| 7,486,803 | B2 | 2/2009 | Camus |
| 7,495,550 | B2 | 2/2009 | Huang et al. |
| 7,680,749 | B1 | 3/2010 | Golding et al. |
| 7,792,641 | B2 | 9/2010 | Liu et al. |
| 8,072,370 | B2 | 12/2011 | Woodington et al. |
| 8,410,920 | B2 | 4/2013 | Ito |
| 8,812,193 | B2 | 8/2014 | Lueke et al. |
| 8,842,884 | B2 | 9/2014 | Klein et al. |
| 8,880,272 | B1 | 11/2014 | Ferguson et al. |
| 2001/0016798 | A1 | 8/2001 | Kodaka et al. |
| 2002/0031242 | A1 | 3/2002 | Yasui et al. |
| 2003/0072471 | A1 | 4/2003 | Otsuka et al. |
| 2003/0174054 | A1* | 9/2003 | Shimomura ............ G01S 7/415 340/435 |
| 2004/0143381 | A1 | 7/2004 | Regensburger et al. |
| 2005/0259158 | A1 | 11/2005 | Jacob et al. |
| 2007/0158593 | A1 | 7/2007 | Partin et al. |
| 2007/0219720 | A1 | 9/2007 | Trepagnier et al. |
| 2007/0233386 | A1 | 10/2007 | Saito et al. |
| 2007/0276600 | A1 | 11/2007 | King et al. |
| 2008/0027607 | A1 | 1/2008 | Ertl et al. |
| 2008/0042812 | A1 | 2/2008 | Dunsmoir et al. |
| 2008/0195292 | A1 | 8/2008 | Naab et al. |
| 2008/0204212 | A1 | 8/2008 | Jordan et al. |
| 2009/0037055 | A1 | 2/2009 | Danner et al. |
| 2009/0088966 | A1 | 4/2009 | Yokoyama et al. |
| 2009/0195414 | A1 | 8/2009 | Riegel et al. |
| 2010/0013917 | A1 | 1/2010 | Hanna et al. |
| 2010/0097200 | A1* | 4/2010 | Hilsebecher ............ G01S 7/412 340/436 |
| 2010/0253598 | A1 | 10/2010 | Szczerba et al. |
| 2010/0256852 | A1 | 10/2010 | Mudalige |
| 2010/0289632 | A1 | 11/2010 | Seder et al. |
| 2010/0329513 | A1 | 12/2010 | Klefenz |
| 2011/0121993 | A1 | 5/2011 | Davis et al. |
| 2011/0190972 | A1 | 8/2011 | Timmons et al. |
| 2011/0199200 | A1 | 8/2011 | Lueke et al. |
| 2011/0313665 | A1 | 12/2011 | Lueke et al. |
| 2012/0139775 | A1 | 6/2012 | Popovic |
| 2012/0303258 | A1 | 11/2012 | Pampus et al. |
| 2014/0032047 | A1 | 1/2014 | Voelz et al. |
| 2014/0160250 | A1 | 6/2014 | Pomerantz et al. |
| 2014/0249722 | A1 | 9/2014 | Hegemann et al. |
| 2015/0105937 | A1 | 4/2015 | Waldbauer et al. |
| 2015/0146008 | A1 | 5/2015 | Conner et al. |
| 2015/0149076 | A1 | 5/2015 | Strauss et al. |

FOREIGN PATENT DOCUMENTS

| | | |
|---|---|---|
| DE | 103 55 807 | 7/2004 |
| DE | 102004018681 | 11/2005 |
| DE | 102005002719 | 8/2006 |
| DE | 102006020631 | 11/2007 |
| DE | 102006040333 | 3/2008 |
| DE | 102006056835 | 6/2008 |
| DE | 102007013023 | 9/2008 |
| DE | 102007016868 | 10/2008 |
| DE | 102009007412 | 8/2010 |
| DE | 102010006828 | 8/2011 |
| EP | 0 640 903 | 3/1995 |
| EP | 1 346 877 | 9/2003 |
| EP | 1 552 975 | 7/2005 |
| EP | 2 012 211 | 1/2009 |
| JP | 2009-023399 A | 2/2009 |
| WO | WO 2004/094186 | 11/2004 |

OTHER PUBLICATIONS

PCT International Preliminary Report on Patentability including English Translation of PCT Written Opinion of the International Searching Authority for International Application PCT/DE2013/200025, dated Feb. 3, 2015, 7 pages, International Bureau of WIPO, Geneva, Switzerland.

German Search Report for German Application No. 10 2012 106 932.8, dated Mar. 7, 2013, 6 pages, Muenchen, Germany, with English translation, 5 pages.

Radu Danescu et al., "Modeling and Tracking the Driving Environment With a Particle-Based Occupancy Grid", IEEE Transactions on Intelligent Transportation Systems, Dec. 1, 2011, IEEE, Piscataway, NJ, USA, vol. 12, No. 4, XP011379328, pp. 1331 to 1342.

Christof Schroeter et al., "A Sensor-Independent Approach to RBPF SLAM—Map Match SLAM Applied to Visual Mapping", Intelligent Robots and Systems, Sep. 22, 2008, IEEE, Piscataway, NJ, USA, XP032335734, pp. 2078 to 2083.

Radu Danescu et al., "Particle Grid Tracking System Stereovision Based Obstacle Perception in Driving Environments", IEEE Intelligent Transportation Systems Magazine, Apr. 1, 2012, IEEE, USA, vol. 4, No. 1, XP011393203, pp. 6 to 20.

Cyrill Stachniss et al., "Exploration with Active Loop-Closing for FastSLAM", Intelligent Robots and Systems, Sep. 28, 2004, IEEE, Piscataway, NJ, USA, vol. 2, XP010765873, pp. 1505 to 1510.

Xia Huang et al., "Lane Following System for a Mobile Robot Using Information from Vision and Odometry", IEEE CCECE 2011, 24th Canadian Conference, May 2011, Niagara Falls, Canada, pp. 1009 to 1013.

C. Wojek, B. Schiele; "A Dynamic Conditional Random Field Model for Joint Labeling of Object and Scene Classes"; European Conference on Computer Vision (ECCV), Marseille, France, 2008, ECCV 2008, Part IV, LNCS 5305, pp. 733-747.

U.S. Dept. of Transportation Federal Highway Administration, "Manual on Uniform Traffic Control Devices (MUTCD): Chapter 3A. General", Aug. 3, 2004, <http://mutcd.fhwa.dot.gov/HTM/2003r1/part3/part3a.htm>.

U.S. Dept. of Transportation Federal Highway Administration, "Manual on Uniform Traffic Control Devices (MUTCD): Chapter 3B. General", Feb. 11, 2010, <http://mutcd.fhwa.dot.gov/htm/2009/part3/part3b.htm>.

\* cited by examiner

METHOD FOR REPRESENTING A VEHICLE ENVIRONMENT WITH POSITION POINTS

FIELD OF THE INVENTION

The invention relates to the technical field of representing structures in the environment of a vehicle as a data base for driver assistance systems with machine perception.

BACKGROUND INFORMATION

For driver assistance systems which are based on sensor systems for detecting the environment, the modeling and representation of the vehicle environment is of great importance. One option of representation is an occupancy grid, in which the vehicle environment is divided into equidistant grid cells and each grid cell is provided with details such as occupied or unoccupied. An alternative approach is the representation in a dense environment representation. Here, an occupancy information is obtained via a defined area in the environment of the vehicle from the sensor data and is entered into an occupancy map. Such a representation allows a direct evaluation of the available maneuver space.

SUMMARY OF THE INVENTION

It is an object of at least one of the embodiments of the present invention to provide a method for representing a vehicle environment.

A method and an apparatus for representing a vehicle environment for a vehicle with a sensor system are provided for detecting the environment, wherein the vehicle environment is described with a predetermined fixed set of position points (in this application equivalent with particles) forming an environment model or representation. The environment representation as a fixed set of particles has the advantage of an always constant data volume which is required for storing and transferring the environment model. This applies in particular when compression methods for reducing the data to be transferred are used, which avoid the redundant transmission of cell groups with the same value. Here, the data volume to be transferred is not constant over sequenced packages. This leads to problems in a close-to-production design of communication channels, in particular in case of time-defined solutions, such as e.g. FlexRay. In particular, the proposed invention thus is advantageous in a transmission of the environment data in a vehicle, e.g. from a first evaluation unit, which calculates an environment representation, to a second unit, which is embodied e.g. as a control device for a driver assistance function. Moreover, it is advantageous that management and access of this data structure are carried out on the software side very efficiently. The fixed set of position points is further used especially dense exactly at those places, where extensive structural descriptions are necessary. This leads to a highly efficient use of the memory reserved for the representation and of the bandwidth for its transmission.

In a preferred embodiment of the invention a position point (particle) is provided with a freely definable number of attributes, which represent a characteristic of the vehicle environment at the position of the position point. An attribute is a position information indicating the position of the position point relative to a host vehicle. The position can be indicated e.g. by distance, angle, spatial coordinates or the like.

In a positive embodiment of the invention at least one position point (particle) but preferably a plurality of position points/all position points is provided with at least one further attribute, which represents a characteristic of the vehicle environment at the position of the position point. The further attribute indicates e.g. a height above the ground or a value for a traversability. For example, a height or depth of a ground wave, the depth of a road ditch, a construction fence (not traversable), a solid road marking (not traversable), a broken road marking (traversable), an object on or near the roadway, e.g. a soda can (traversable), another vehicle (not traversable) can be specified as an attribute of the position point.

BRIEF DESCRIPTION OF THE DRAWINGS

In order that the invention may be clearly understood, it will now be described in connection with example embodiments thereof with reference to the accompanying drawings, wherein.

DETAILED DESCRIPTION OF EXAMPLE EMBODIMENTS OF THE INVENTION

Figure 1:
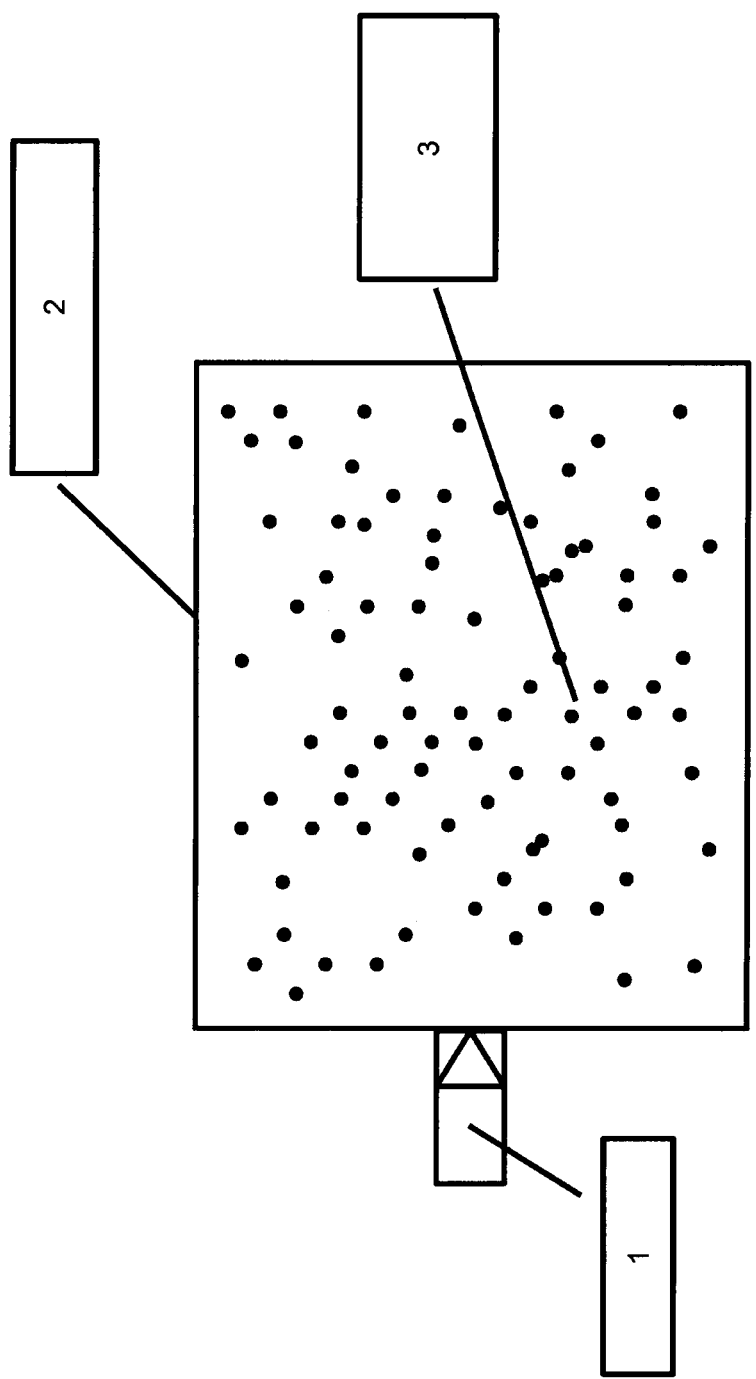
FIG. 1 is a schematic diagram of an initial distribution of position points representing an environment in front of a vehicle.

FIG. 1 schematically shows a subject vehicle (1) equipped with a sensor system for detecting objects in a vehicle environment (2) ahead of the vehicle. The vehicle environment is to be represented in an environment representation or environment model in which the environment is described or defined by a predetermined fixed set of position points or particles to represent structures or objects in the environment.

In a preferred embodiment of the method the position points are stochastically distributed in a specifiable detection range—if there is no information on an environment structure (4), what is the case in particular with a restart of the detection system (5). Such a distribution (3) is shown as an example in FIG. 1.

Figure 3:
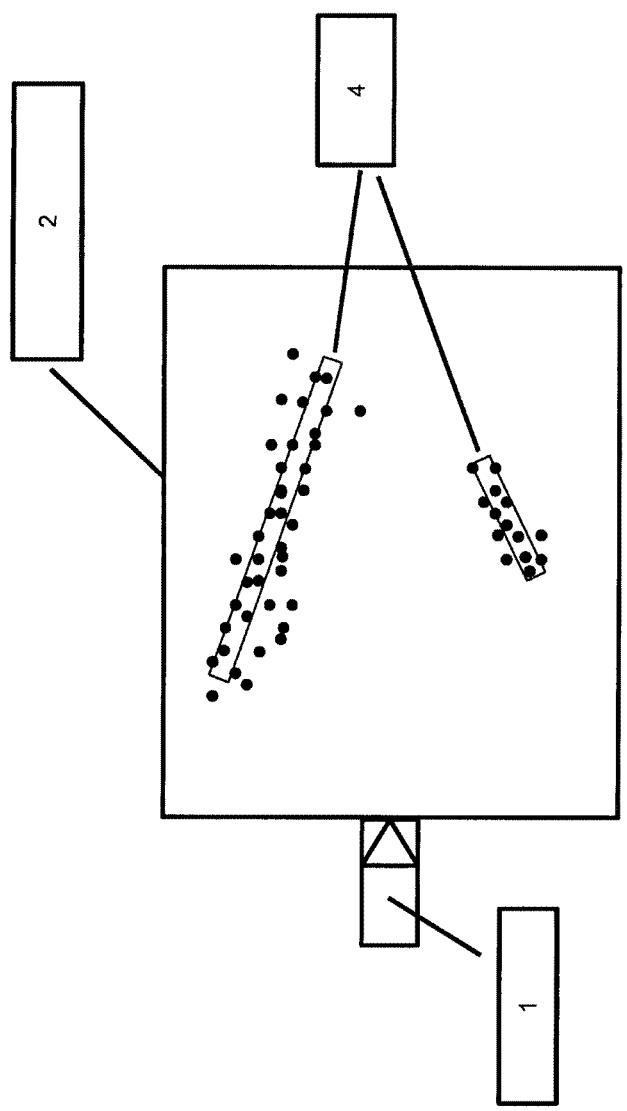
FIG. 3 is a schematic diagram similar to FIG. 1 but showing the position points re-distributed dependent on sensor data indicating recognized structures in the vehicle environment.

In particular, the method provides that the particles are arranged in the detection range based on the data of the sensor system for detecting the environment (2), the distribution of the position points in the detection range being carried out subject to recognized structures in the vehicle environment. Structures (4), which are not or only partially traversable are represented with a high density of position points. Such a distribution is shown as an example in FIG. 3.

Preferably, the sensor system (5) comprises at least one radar sensor for detecting the environment. Here, the position points are arranged subject to a reflected radar radiation, in particular as a function of the amplitude or energy of the reflected radar radiation.

The radar sensor detects an amount of energy that can be located, which can be used in particular as an indicator of the existence and solidity of typical environment structures such as construction walls or construction warning poles. A simple interpretation of the sensor data, i.e. the specific sensor model (6), means in this case a distribution of the available set of position points analogous to the reflected energy and according to the position of the reflection.

Preferably, the method is applied when the sensor system (5) for detecting the environment comprises a plurality of different types of sensors. For each sensor and each sensor type a specific sensor model (6) is provided for adjusting the distribution of the position points. The sensor model (6) represents the recognized structures via a corresponding distribution adjustment of the particles in the environment representation. To enter the data on the structure (4) of the environment into the environment representation, a specific sensor model (6) must exist for each sensor, which takes into account its detection possibilities and capacities. A sensor model for a radar sensor has been described above as an example.

Figure 2:
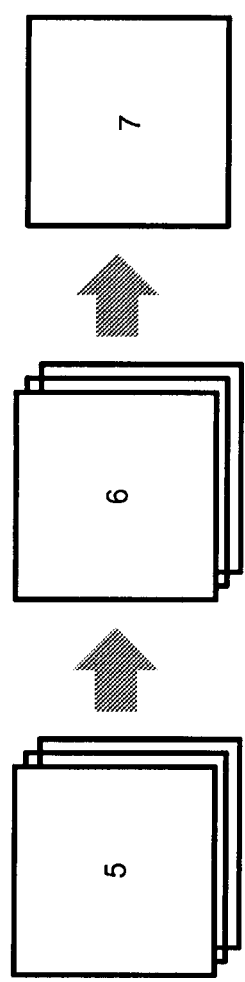
FIG. 2 is a schematic diagram representing a sensor system providing sensor data into respective sensor models to produce a merged position point representation.

In FIG. 2 it is schematically shown that one sensor model is created for each sensor and thereafter a plurality of sensor models (6) is merged.

A simple method for merging (fusioning) of the particles of several sensors is to accumulate in cycles all particles obtained by the different sensors (sensor models) in a common representation. A cycle is a predetermined duration of time. Preferably, the position points are updated in each cycle. This method can be used in particular for the merging of the particles of several sensors, whose visual fields do not or only slightly overlap, to maintain a high accuracy of the merged representation. The total number of particles is constant in this case and equal to the sum of the numbers of particles of the merged sensors. With strongly overlapping visual fields a simple accumulation leads to an increased consumption of resources as compared with the particle representation of an individual sensor. To limit the consumption of resources, a representation with a reduced number of particles can be selected for the merger. The distribution of these particles is adjusted in the merger such that they approximate as well as possible the cumulative distribution of the particle representations to be merged.

The reduction of the number of particles can be carried out for example by providing the particles for the reduction additionally to their parameters with a weighting factor. Here, for a particle of the merged total representation it applies that e.g. the higher the weight, the more particles are in the sensor representation in its environment. For reduced total representation a new particle set is created by randomly drawing from the initial representation (sensor representation) new particles until the predetermined set is reached, the occurrence probability of a particle in the reduced representation being proportional to the weight in the initial representation.

Furthermore, the weighting factor can depend on the state variable or variables derived therefrom, e.g. a higher weighting factor with a high gradient of the course of the state variable.

The state variables of a particle of the reduced representation (e.g. occupancy probability or height) can be determined from the adjacent particles by interpolation (e.g. constant, linear, quadratic).

LIST OF REFERENCE NUMERALS

1 Host vehicle
2 area of environment presentation
3 stochastic distribution of the position of points
4 structures
5 sensors
6 sensor models
7 merged particle representation

The invention claimed is:

1. A driver assistance method for a vehicle, comprising the steps:
  a) with a sensor system of the vehicle, detecting zero or more detected objects in a detection area in an environment outside of the vehicle, and producing corresponding sensor data representative of the zero or more detected objects;
  b) in a data structure in a memory of a driver assistance system of the vehicle, populating the data structure with a predetermined fixed number of position points, wherein the predetermined fixed number is independent and regardless of a number of the zero or more detected objects that are detected in the detection area;
  c) in the data structure in the memory of the driver assistance system, forming an environment model representative of the detection area in the environment by distributing the predetermined fixed number of the position points in the data structure dependent on the sensor data; and
  d) with the driver assistance system of the vehicle, controlling a driver assistance function dependent on the environment model.

2. The driver assistance method according to claim 1, wherein the steps b) and c) are performed by an evaluation unit of the driver assistance system, and the step d) is performed by a control device of the driver assistance system.

3. The driver assistance method according to claim 1, further comprising, initially distributing the predetermined fixed number of the position points according to a stochastic distribution in the data structure before the sensor system has produced the sensor data.

4. The driver assistance method according to claim 1, wherein, when the sensor data represents zero detected objects, then the distributing of the predetermined fixed number of the position points in the step c) is according to a stochastic distribution in the data structure.

5. The driver assistance method according to claim 4, wherein, when the sensor data represents at least one of the detected objects, then the distributing of the predetermined fixed number of the position points in the step c) is dependent on the at least one detected object.

6. The driver assistance method according to claim 1, wherein, when the sensor data represents at least one of the detected objects, then the distributing of the predetermined fixed number of the position points in the step c) is dependent on the at least one detected object.

7. The driver assistance method according to claim 6, wherein the distributing of the predetermined fixed number of the position points in the step c) comprises arranging the position points in the environment model dependent on a respective position of each of the at least one detected object in the detection area in the environment.

8. The driver assistance method according to claim 6, wherein the distributing of the predetermined fixed number of the position points in the step c) comprises arranging the position points in the environment model dependent on a respective position, size and shape of each of the at least one detected object in the detection area in the environment.

9. The driver assistance method according to claim 1,
  further comprising determining, from the sensor data, a respective degree of traversability of the detected objects and of regions of the detection area without the detected objects,
  wherein the distributing of the predetermined fixed number of the position points in the step c) comprises arranging the position points in the environment model with a spatial density that is dependent on the respective degree of traversability of the detected objects and of the regions of the detection area without the detected objects.

10. The driver assistance method according to claim 1, wherein the distributing of the predetermined fixed number of the position points in the step c) comprises arranging the position points with a higher spatial density at places in the detection area where extensive structural descriptions are necessary.

11. The driver assistance method according to claim 1, wherein each respective one of the position points has a plurality of attributes associated therewith, and a first one of the attributes is a position information indicating a position, relative to the vehicle, of a respective point in the detection area of the environment that is being represented by the respective position point in the environment model.

12. The driver assistance method according to claim 11, wherein a second one of the attributes is a height information indicating an above-ground height of a respective one of the detected objects at the respective point in the detection area of the environment.

13. The driver assistance method according to claim 11, wherein a second one of the attributes is a traversability information indicating a traversability, by the vehicle, of a respective one of the detected objects at the respective point in the detection area of the environment.

14. The driver assistance method according to claim 1, wherein the sensor system comprises a radar sensor, the sensor data represents a respective position as well as a respective amplitude or energy of reflected radar radiation that is respectively reflected back from the one or more detected objects in the detection area in the environment, and the distributing of the position points in the step c) comprises arranging the position points in the environment model dependent on the respective position as well as the respective amplitude or energy of the reflected radar radiation.

15. The driver assistance method according to claim 14, wherein the distributing of the position points in the step c) comprises arranging the position points in the environment model such that more position points are arranged in a first region in which the respective amplitude or energy of the reflected radar radiation has a higher value, than in a second region in which the respective amplitude or energy of the reflected radar radiation has a lower value relative to the higher value.

16. The driver assistance method according to claim 1, wherein the sensor system comprises plural sensors of plural different sensor types, wherein respective visual fields of the plural sensors do not overlap or only slightly overlap or strongly overlap, and
wherein the method further comprises:
in the data structure in the memory of the driver assistance system, providing a respective specific sensor model respectively for each one of the sensors and each one of the sensor types for adjusting the distribution of the position points in the data structure dependent on the detected objects in the environment.

17. The driver assistance method according to claim 16, wherein the respective position points of the respective sensors of the different sensor types are merged by accumulating, in respective time cycles, position points of each one of the sensors in a common merged representation from which the environment model is formed.

18. The driver assistance method according to claim 17, wherein a total number of the position points from all of the sensors exceeds the predetermined fixed number of position points, and wherein the method further comprises reducing the number of the position points for the common merged representation to the predetermined fixed number of position points by selecting only some of the position points for the common merged representation.

19. The driver assistance method according to claim 18, wherein the selecting of only some of the position points for the common merged representation comprises selecting those position points that best approximate all of the position points from all of the sensors.

20. The driver assistance method according to claim 18, further comprising assigning respective weights to all of the position points,
wherein the respective weight for a respective position point is respectively determined dependent on at least one of: i) a stored state variable representing an occupancy probability or an obstacle height, and ii) a number of others of the position points that are adjacent to the respective position point, and
wherein the selecting of only some of the position points comprises selecting the position points in order according to the respective weights assigned thereto until the predetermined fixed number of the position points is reached.

* * * * *